A. Stewart,
Water Wheel.

N° 45,191.   Patented Nov. 22, 1864.

Witnesses
C. L. Topliff
Henry Morris

Inventor;
A. Stewart.
By Munn & Co.
Att'ys.

United States Patent Office.

AMOS STEWART, OF MOUNT LEBANON, NEW YORK.

IMPROVEMENT IN WATER-WHEELS.

Specification forming part of Letters Patent No. 45,191, dated November 22, 1864.

*To all whom it may concern:*

Be it known that I, AMOS STEWART, of Mount Lebanon, in the county of Columbia and State of New York, have invented a new and Improved Water-Wheel; and I do hereby declare that the following is a full, clear, and exact description thereof, which will enable others skilled in the art to make and use the same, reference being had to the accompanying drawings, forming part of this specification, in which—

Figure 1:
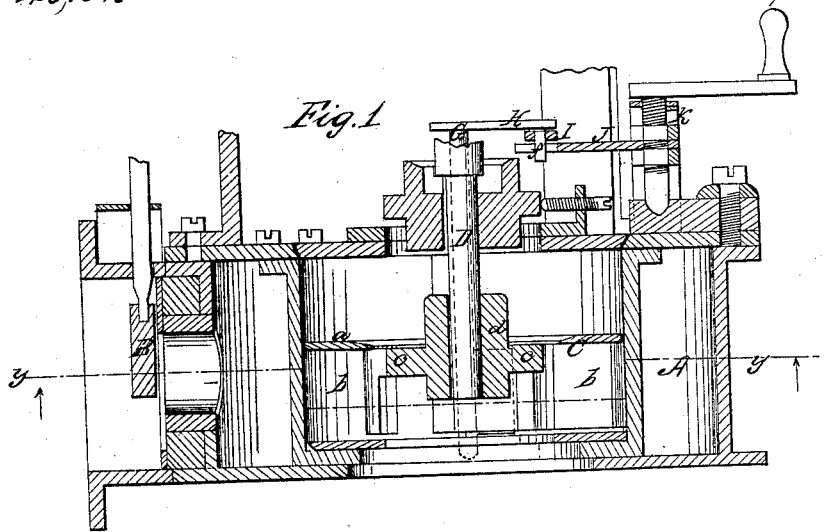
Figure 2:
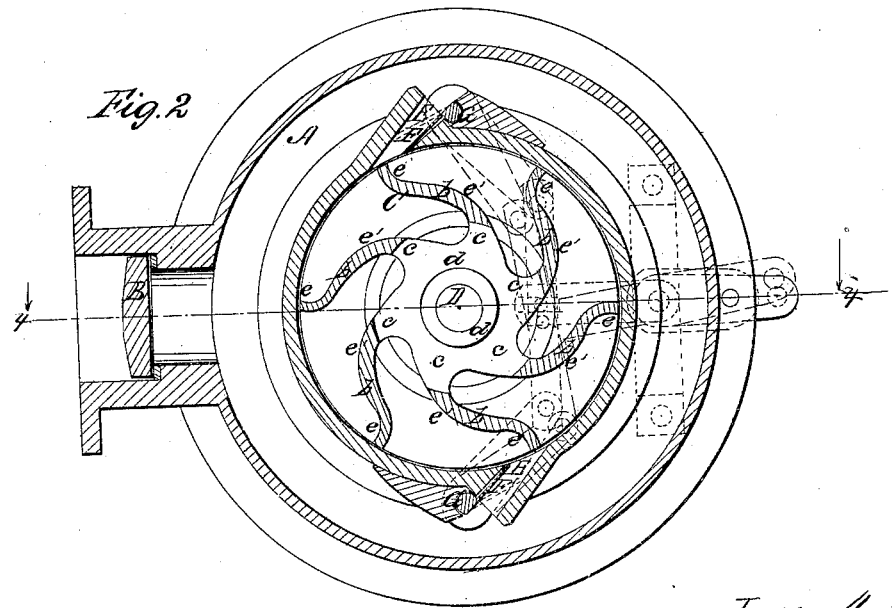

Figure 1 is a vertical central section of my invention, taken in the line $x$ $x$, Fig. 2; Fig. 2, a horizontal section of the same, taken in the line $y$ $y$, Fig. 1.

Similar letters of reference indicate like parts.

This invention relates to the peculiar form or shape of the buckets, and to a particular manner of applying the water to the wheel, as hereinafter fully shown and described, whereby the journals of the wheel-shaft are not subjected to any lateral pressure, and much friction thereby avoided, and the admission of the water to the wheel allowed to be regulated by a governor, so as to enable the wheel to operate evenly or uniformly with a greater or less power, as may be desired.

A represents an annular box through which the water is admitted to the wheel, the latter being placed within or at the center of said box, and the latter provided with a gate, B, for the purpose of regulating the supply of water to the wheel as may be desired.

C is the wheel, which is firmly keyed on a vertical shaft, D, and is composed of an annular top plate, $a$, from the under surface of which the buckets $b$ depend, the latter, as well as the plate $a$ being connected by arms $c$ to a hub, $d$, which is keyed on the shaft D. The buckets $b$ are of serpentine form longitudinally, having a concave surface, $e$, at their outer ends and face sides where the water first acts against them, the other portion, $e'$, being convex and extending from $e$ to the arms $c$, as shown clearly in Fig. 2. The concave surface $e$, it will be seen, is quite short, or comprises but a small portion of the length of the buckets, the concave portion $e'$ being much the longest. The buckets $b$ have an oblique position relatively with the hub $d$, and the spaces between them gradually diminish in width from their outer to their inner ends.

The box A is provided with two orifices or water-discharge passages, E E, at opposite points at its inner side, (see Fig. 2,) and within each of these passages a gate, F, is placed vertically, said gates being attached to shafts G G, which pass up through the top plates of the box A, and have each a lever, H, attached to them, the outer ends of which are connected by a bar, I, which is provided at its center with a pin, $f$, the latter passing through a slot in the end of a lever, J, which is on a vertical shaft, K. This shaft K is connected with a governor of any proper construction.

The water-discharge passages E E have a tangential position relatively with the wheel, so that they will direct the water against the concave surfaces $e$ of the buckets at right angles. The gates F, by being adjusted more or less open, admit the water to the wheel in thicker or thinner sheets, and as these gates are operated by the governor the wheel is made to act evenly or uniformly under any given power, the amount of power given out by the wheel being regulated by the gate B of the box A.

By having the water-discharge passages at opposite sides of the wheel the shaft of the latter is not subjected to any lateral pressure, and consequently much friction is avoided, and by having the buckets $b$ of the serpentine form as described, the water is made to first act by impact against the concave surfaces $e$ of the buckets, and then react on the convex surfaces $e'$ as it passes toward the center of the wheel, where it is discharged.

Having thus described my invention, I claim as new and desire to secure by Letters Patent—

The serpentine buckets $b$, having a concave surface, $e$, at their outer ends, and a convex portion, $e'$, from the concave surfaces $e$ to the hub of the wheel, in combination with the two water-discharge passages E E, placed at opposite sides of the box A, and the gates F, connected by the bar I, which is to be controlled by the governor.

AMOS STEWART.

Witnesses:
AVERY ALLEN,
D. C. BRAINARD,
EDWIN KENDALL.